United States Patent [19]

Finley

[11] 4,189,379

[45] Feb. 19, 1980

[54] METHOD FOR BRINGING NUTRIENT-RICH WATER FROM THE APHOTIC ZONE OF THE OCEAN TO THE PHOTIC ZONE

[76] Inventor: Warren T. Finley, 10352 Miralago Pl., Santa Ana, Calif. 92705

[21] Appl. No.: 931,675

[22] Filed: Aug. 7, 1978

Related U.S. Application Data

[63] Continuation-in-part of Ser. No. 833,939, Sep. 16, 1977, abandoned.

[51] Int. Cl.$^2$ ...................... B01D 13/00; B01D 13/02
[52] U.S. Cl. .............................. 210/22 D; 210/23 R; 426/2; 204/180 R; 119/3
[58] Field of Search .................. 210/22, 23 H, 321 R, 210/433 M, 170, 23 R, 23 F; 119/3, 51 R, 72; 204/180 P, 186, 195 P, 302, 180 R; 426/2; 405/203

[56] References Cited

U.S. PATENT DOCUMENTS

| | | | |
|---|---|---|---|
| 3,060,119 | 10/1962 | Carpenter | 210/321 R |
| 3,171,808 | 3/1965 | Todd | 210/22 |
| 3,283,813 | 11/1966 | Brownscombe et al. | 210/22 |
| 3,456,802 | 7/1969 | Cole | 210/321 R |
| 3,725,233 | 4/1973 | Smith | 204/180 P |
| 3,869,364 | 3/1975 | Teseda | 204/301 |
| 3,928,145 | 12/1975 | Othmer | 119/3 |
| 4,051,810 | 10/1977 | Briet | 119/3 |
| 4,096,067 | 6/1978 | Sargent et al. | 210/252 |
| 4,125,463 | 11/1978 | Chenoweth | 210/23 H |

OTHER PUBLICATIONS

"RO How It Works, What It Costs", B. Leightell, Filtration and Separation, Nov.–Dec., 1971, pp. 715–717.
"The Osmotic Pump", O. Levenspiel et al., Science, Jan. 18, 1974, vol. 183, No. 4142, pp. 157–160.
"Operating Experience With a 23m$^3$/day Reverse Osmosis Plant", J. R. Grover et al, The Chemical Eng., Jan. 1972, pp. 24–28.

*Primary Examiner*—Charles N. Hart
*Assistant Examiner*—David R. Sadowski
*Attorney, Agent, or Firm*—Knobbe, Martens, Olson, Hubbard & Bear

[57] ABSTRACT

Nutrient-rich ocean water from the aphotic zone of the ocean, which normally begins at about 100 to 200 meters below the ocean surface, is desalinated or partially desalinated in situ using electro-dialysis to leave the nutrients in the water. The nutrient-rich desalinated water thus obtained, being of lesser density than the surrounding seawater, naturally rises through conduits into the relatively nutrient-poor photic zone of the ocean and is dispersed therein, thus increasing the concentration of nutrients in the photic zone near the surface of the ocean. This increases the fertility of the near-surface photic zone, and thus increases the supply of harvestable food fish from the near-surface photic zone.

3 Claims, 1 Drawing Figure

METHOD FOR BRINGING NUTRIENT-RICH WATER FROM THE APHOTIC ZONE OF THE OCEAN TO THE PHOTIC ZONE

RELATED APPLICATION

This is a continuation-in-part of my co-pending application Ser. No. 833,939, filed Sept. 16, 1977, now abandoned.

BACKGROUND OF THE INVENTION

The present invention relates to increasing the amount of organic nutrients in ocean water, particularly within a few hundred feet of the surface, so as to increase the production of harvestable food in these near-surface waters. Specifically, this invention concerns itself with a means for artificially inducing an upwelling of relatively nutrient-rich water from the lower depths of the ocean into the relatively nutrient-deficient near-surface waters.

Life on earth depends ultimately on food created by green plant organisms through the process known as photosynthesis. Photosynthesis requires the presence of sunlight, and, in the oceans, sufficient sunlight to support the process of photosynthesis is present only in the water that is less than 100 to 200 meters below the surface. This area where all the ocean's photosynthesis takes place is known as the photic zone. Below the photic zone is the area where there is insufficient light to support photosynthesis, and this zone is known as the aphotic zone.

Because of the presence of sunlight for photosynthesis, the photic zone is the habitat for the minute green plant organisms known as phytoplankton which comprise the first link in the food chain which culminates in those organisms which are consumed as food by man. However, the amount of life which can be sustained in the photic zone is limited by the quantity of such substances as nitrogen, phosphorous, copper, and organic nutrients, which are required to sustain life. In the photic zone these substances are constantly being depleted by the life forms present in the zone and thus the amount of life which the photic zone can support is self-limiting.

However, the above-mentioned life sustaining substances and nutrients are present in constant abundance in the aphotic zone below the photic zone. This is due to the relative scarcity of nutrient-depleting life forms in the aphotic zone. Furthermore, the aphotic zone is constantly enriched in nutrients from decaying organic matter that sinks from the overlying photic zone. Thus, the aphotic zone is, on the average, substantially richer in nutrients than the photic zone.

Therefore, if nutrient-rich water from the aphotic zone can be introduced into the photic zone, the amount of life that could be sustained in the photic zone would be substantially increased. Such a mixing of aphotic zone water and photic zone water is not easily achieved since the aphotic zone water is normally colder and thus denser than the photic zone water and will therefore not normally rise into, and mix with, the photic zone water. However, in a number of areas in the ocean, a variety of natural mechanisms serve to bring the deep aphotic zone water up into the photic zone. These areas are known as "upwelling areas" and they occur in places where offshore winds, equatorial currents, or large ocean waves are strong enough to produce a substantial mixing and churning effect that is sufficient to pull the deep water into the near-surface photic zone. Also, in polar seas, seasonal cooling of the surface water causes the surface water to become cooler and denser than the deeper water and thus an upwelling situation can arise in such areas. Because of the upwelling of nutrient-rich aphotic zone water into the photic zone, these upwelling areas are extraordinarily fertile, and it has been estimated that these upwelling areas support approximately one-half of the total available food fish in the oceans, even though these upwelling areas constitute only a small fraction of the total sea surface.

As the state of the art exists today, there is no practical means for inducing upwelling by means of artificially induced thermal convection currents.

SUMMARY OF THE INVENTION

The present invention avoids the disadvantages of thermally operated systems through the use of radically different principle for moving the deep water upward. Seawater, with its substantial quantity of solutes, is significantly denser than fresh water. Therefore, if a portion of the solutes are removed from the deep aphotic zone water, it becomes less dense than the surrounding water and rises into the photic zone where it disperses. The present invention makes use of this principle by submerging a water desalination device well below the boundary between the photic and aphotic zones. The desalination device may operate, for example, by means of electro-dialysis, such devices being well known in the art of water desalination. Any desalination device which substantially reduces salt content while leaving the water nutrient-rich could be used. Known electro-dialysis processes leave a high concentration of nutrients in the dilute portion of the water because they cannot pass through the membranes, while the salt ions are pulled through the membranes by electric forces.

Preferably the device does not require any source of power from the surface, such as electrolytic desalinators of a known type which are operated by the temperature differential in the water. For desalinators requiring power from the surface, power lines would be extended down to the device. In any event, deep aphotic zone water enters the desalination device and is partially desalinated therein. The partially desalinated water so produced still contains a substantial quantity of nutrient substances. It is believed that a reduction of about 20% of the salinity might achieve satisfactory results while leaving sufficient nutrients. This partially desalinated water, being less dense than the surrounding seawater, rises naturally upward through conduits into the photic zone where it is dispersed into the surrounding water, thereby fertilizing the photic zone water with the fresh nutrients from the deep aphotic zone.

DETAILED DESCRIPTION OF THE INVENTION

Figure 1:
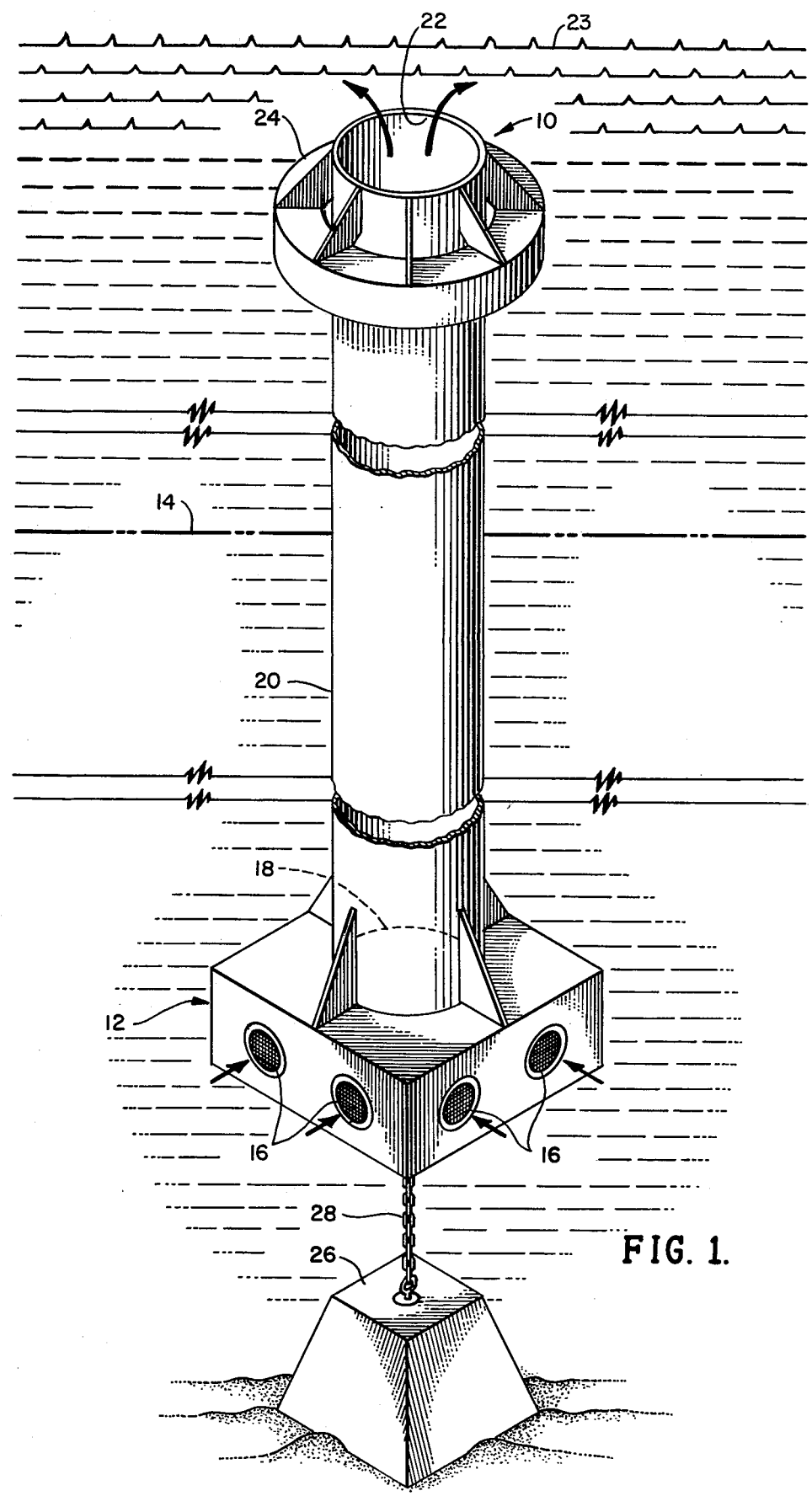
FIG. 1 is a perspective view of the present invention showing it in its under-sea implacement.

The present invention, designated generally in the drawing by the numeral 10, consists of a seawater desalination unit 12 which is submerged in the ocean in the aphotic zone which, in the drawing, is the area below the dotted line 14. Seawater from the aphotic zone flows through intake ports 16 into the desalination device where the water is partially desalinated, for example, by means of electro-dialysis. The partially desalinated water leaves the desalination device through outlet port 18 from which, due to its decreased density as compared to the surrounding water, it rises through a conduit 20 which guides the water up into the photic zone (the area above the dotted line 14) near the ocean surface 23 where it is dispersed through the dispersal outlet 22.

The entire device may be suspended in the ocean's depths by means of gas-filled buoyancy tanks 24 in conjunction with an anchor 26 and anchor chain 28. Alternatively, the device may be suspended from cables attached to surface buoys. Various other means may be devised to suspend the device at the desired depth without departing from the concept of the present invention.

I claim:

1. A method of bringing nutrient-rich ocean water from the aphotic zone of the ocean up to the photic zone to increase the concentration of nutrients in the photic zone, comprising:

submerging a water desalinating means into the aphotic zone of the ocean;

introducing seawater from the aphotic zone into said desalinating means;

at least partially desalinating the seawater introduced into said desalinating means while leaving a high concentration of nutrients in said desalinated seawater; and increasing the concentration of nutrients in the photic zone by conducting the nutrient-rich desalinated water thereby produced into the photic zone.

2. A method, as defined in claim 1, and further comprising the steps of dispersing the nutrient-rich desalinated water in the photic zone.

3. A method, as defined in claim 1, wherein said desalination is done by electro-dialysis.

* * * * *